Jan. 12, 1960 W. M. WISE 2,920,654
HYDRAULIC WEIGHING SCALE
Filed April 13, 1956
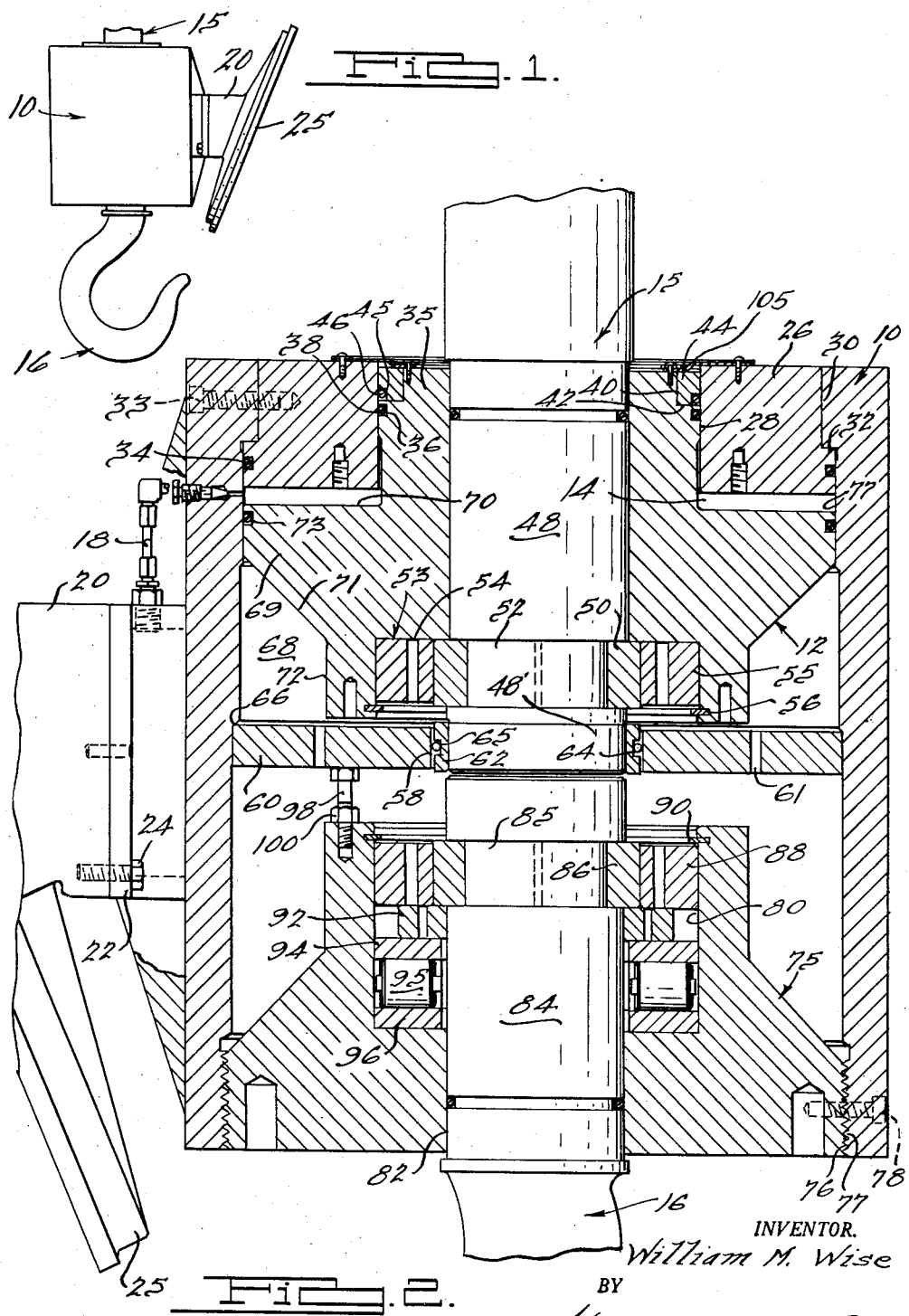
INVENTOR.
William M. Wise
BY
Harness, Dickey & Pierce
ATTORNEYS

2,920,654

HYDRAULIC WEIGHING SCALE

William M. Wise, Royal Oak, Mich.

Application April 13, 1956, Serial No. 578,069

4 Claims. (Cl. 137—778)

This invention relates to hydraulic weighing scales, and particularly to improvements in the construction of weighing scales of the general class disclosed in my Patent No. 2,643,873, issued June 30, 1953.

An important object of the present invention is to provide an improved scale of the indicated variety, utilizing load sensing means comprising a cylinder, a piston, and an interposed liquid adapted to be pressurized by the load, the scale being so designed and constructed that friction within the load sensing means is reduced to an absolute minimum.

A further object is to provide such a scale which is highly resistant to variation of its characteristics due to wear of parts, and the accuracy of which is not disturbed by the imposition of lateral forces.

A further object is to provide such a scale which is relatively simple and inexpensive to construct and to assemble, as well as to charge and adjust.

Another object is to provide such a weighing scale which is capable of handling very heavy loads and which is itself of minimum weight.

Other objects and advantages of the invention will become apparent upon consideration of the present disclosure in its entirety.

In the drawing:

Figure 1 is a side elevational view of a weighing scale incorporating the present invention; and Figure 2 is a view on a larger scale, principally in longitudinal diametric cross section, but partly in elevation, of the load sensing portions of the scale.

Referring now to the drawing, wherein my invention is illustrated in a crane scale mechanism, reference character 10 designates generally a steel cylinder within which a piston assembly generally designated 12 is movably mounted, in such manner as to pressurize, in proportion to the load of the scale, a quantity of a suitable liquid such as oil (not shown) which fills the cylinder space 14 and which also fills communicating passages which are not fully shown but which include the connecting tube 18, and a pressure responsive portion which will be referred to hereinafter.

The piston assembly 12 is rigidly connected to a suspension eye generally designated 15 which is adapted to be suspended from a crane hook or other suitable support, and the cylinder is rigidly held against axial movement with respect to a hook assembly generally designated 16, from which a load to be weighed is adapted to be suspended. The suspension eye 15 and hook 16 may of course be varied in construction and in themselves form no part of my present invention.

The pressure cylinder space 14 is connected through the agency of suitable means, including the coupling tube 18 to suitable load indicating means (not shown) which may comprise a Bourdon tube-type or other appropriate pressure gauge housed within a casing portion 20 rigidly attached as by flange and screw portions 22, 24 to the side of the cylinder 10, the casing 20 in turn supporting a housing portion 25 for a dial and pointer, by which an indication of weight may be given. Such features are shown in my patent above referred to and are known in the art.

As its upper end the cylinder is partially closed by a head ring 26 having a concentric cylindrical internal wall 28. The cylinder is provided at its upper extremity with an inwardly projecting concentric flange portion 30 which is of lesser axial length than and overhangs a part of the head ring 26. The lower portion of the head ring has a flange portion 32 which projects outwardly to underlie the inwardly directed cylinder flange 30. The head ring 26 is inserted from the lower end of the cylinder and is locked against upward displacement by the graduated diameters of such overengaging flange portions 30, 32. The head ring is also secured in place by radial lock screws as 33. A perfect seal between the cylinder and head ring is insured by an O-ring 34 fitted in a suitable peripheral groove in the head ring and compressed between the head ring and cylinder wall.

The piston 12 has a reduced upper extremity or neck 35 which has an easy sliding fit in the bore 28 in the head ring 26 and which is provided with a peripheral groove 36 in which an O-type sealing ring 38 is fitted, which maintains sealing engagement with the surface 28 of the head ring. At its upper extremity the reduced piston portion 35 is provided with a peripheral rabbet 40 having a flat bottom surface 42 and in which a hardened steel wear ring 44 is fitted and held fast with respect to the piston. The ring 44 is provided with a smaller peripheral rabbet 45 at its lower end which coacts with the flat surface 42 to define a peripheral groove within which a plurality of bearing balls 46 are accommodated. The ring 44 and the inner surface of head ring 46 are hardened, so that they will not be worn substantially by the hardened steel balls 46, but the main body portion of the piston 12 need not be hardened.

The central portion 69 of the piston is accurately finished to have a very slight clearance with respect to the internal wall 77 of the cylinder and is sealed with respect thereto by an O-ring 73 carried by the piston.

The straight cylindrical stem portion 48 of the suspension eye 15 is held against upward displacement with respect to the piston by a lock ring assembly 50 formed in two semi-circular halves and projecting radially inwardly into a peripheral groove 52 in the shank 48 and also projecting radially outwardly from the shank to partially underlie the upper wall 53 of a counterbored portion 54 formed concentrically in the lower extremity of the piston 12. The diameter of the downwardly opening counterbored portion 54 substantially exceeds the outside diameter of the ring assemly 50, and a filler ring 55 is fitted in the counterbore around the ring assembly 50 to prevent outward displacement of the two sections of the latter. The retaining ring 50 is held in place by an internal snap ring 56 fitted in an internal slot (undesignated) in the counterbored portion 54, below the retaining ring.

The shank 48 of the suspension eye projects downwardly below the piston and forms a lower bearing-supporting portion, being extended through a cylindrical opening 58 in a bearing wall 60 which extends across the cylinder spacedly beneath the piston and which is pressed or otherwise rigidly secured in place. The bearing wall 60 may also be formed of steel, and its cylindrical internal bearing surface, which is concentric with the cylinder, is hardened. A bearing ring 62 is secured to the lower end of the shank in a position opposite the bearing wall 58, and is provided with a peripheral groove 64 in which a series of hardened steel bearing balls 65 are fitted. The ring 62, or at least the outer face portion having the ball groove therein, is also hardened.

The skirt of the piston 12 is cut away in an area, designated 68, extending from an annular line spaced below the piston head portion 70 to the lower end of the piston. The upper end of the cutaway portion 68 preferably defines a truncated conic wall 71 which, at its lower end, joins a vertical cylindrical wall 72 spaced outwardly from and surrounding the counterbored portion 54. The inclination of the wall 71 may be such as to reinforce the head 70 against which the principal pressure resulting from loading of the scale is exerted.

All of the parts except the shank 48 are fitted into the cylinder from the lower end, the cylinder being counterbored in a plurality of steps of successively graduatedly decreasing diameter upwardly from the lower end. Such counterborings of the cylinder are performed in such manner as to provide a shoulder 66 to limit upward movement of the bearing wall 60 and accurately locate the latter.

The lower end of the cylinder is closed by a head generally designated 75 which may, as shown, be provided at its lower end with an externally threaded portion 76 screwed into a conformably internally threaded portion 77 at the lower end of the cylinder, and suitably locked in place, as by lock screw means 78. The lower head 75 extends upwardly within the cylinder and is provided with a relatively deep axial counterbore 80 at its upper end communicating with an axial bore 82 extending downwardly and completely through the head.

The shank 84 of the hook 16 extends upwardly through the bore 82 and counterbore 80 and is provided within the area surrounded by the counterbore with a peripheral groove 85. A lock ring 86 is fitted into and projects radially outwardly from the groove 85 and may be formed in two semicircular sections, as in the case of the ring 50, and similarly held against escape from the groove by a retaining ring 88 which fills the radial space between the ring 86 and the internal wall of the counterbore 80 and blocks escape of the sections of the ring 86. Upward escape of the filler ring 88 is prevented by an internal snap ring 90. Ring 88 is preferably fitted relatively loosely in the counterbore, and the two rings 86 and 88 rest upon a thrust ring or washer 92 which in turn rests upon the upper race 94 of a thrust roller bearing assembly. The rollers of the bearing assembly are designated 95 and these roll upon a bottom race plate 96 seated on the bottom of the counterbore. It will be appreciated that if rotary force is applied to the hook, it and its shank 84 may turn freely with respect to the scale body on the bearing rollers 95.

As previously noted, all of the components contained within the cylinder 10 are assembled from the lower end, with the exception of the shank 48 of the suspension eye. It will be apparent that after the piston 12 is inserted, the shank 48 is pushed in from above and then locked from the underside of the piston by the insertion of the lock ring sections 50 and retaining ring 55 and snap ring 56. The bearing ring 62 is also inserted over and secured to the lower end of the shank from beneath. This is preferably done after the bearing plate 60 is inserted, since this facilitates the insertion of the bearing balls 65. The bearing plate 60 is preferably locked against downward displacement by a plurality of abutments 98 (only one of which is shown in the drawing) extending upwardly from the top of bottom head 75. These may, as shown, comprise machine screws fitted in suitably positioned tapped holes in the head and held in preliminarily adjusted positioning as by a lock nut 100.

An important consideration in achieving accuracy and sensitivity in a hydraulic scale is the reduction of friction to an absolute minimum. The use of a piston, rather than a diaphragm, is desirable from the standpoint of accuracy and linearity. In the present construction the largest portion 69 of the piston is so fitted as to move freely but accurately within the cylinder. It will be appreciated that the actual travel is very slight, being of the order of a few thousandths of an inch maximum for a load of 200,000 lbs. The power required to distort the O-rings is accordingly very low. In addition, it is uniform at each actuation of the scale, and does not introduce static friction. The reduced upper neck 35 and ring 44, fitted within the top head ring 26 are also freely slidable in the bore 28, and the ring 62 has a free sliding fit in the bearing ring 60. The neck 35 and the downwardly projecting portion 48' of stem 48 are accurately centered by the bearing balls 46 and 65 respectively, so that these portions act as pilots for the piston, and it will be appreciated that friction is held to an absolute minimum by the reduction in diameter of such pilot parts which are mounted in the ball bearings. By reason of the wide vertical spacing of the two bearings defined by the balls 46—65, any nonaxial loads tending to tilt the piston with respect to the cylinder apply minimum radial loads to the balls and races, so that they cannot be distorted enough to introduce appreciable static friction. Only the surfaces which are directly engaged by the balls need be hardened, and such surfaces are carried by parts which are relatively small and which can be finish ground after heat-treating, so that distortion is held to a minimum and cost is substantially reduced.

The bearing ring or plate is preferably apertured, as indicated at 61, to permit free movement there-through of air displaced by the piston. Although the piston travel is very slight, as indicated above, it is advantageous to minimize any variation of pressure below the piston. Inasmuch as scales of this type may be left out of doors in all kinds of weather, it is also advantageous to form the lower head 75 as a closure, as shown, even though the pressure fluid is entirely above the piston, in order to keep out atmospheric moisture and minimize oxidation. The apertures 61 allow the space below bearing support plate 60 to act as a part of the air chamber below the piston, thereby reducing the compression ratio and, thus, the range of pressure variance and the resistance to piston movement developed below the piston. A limp annular weather seal member as 105 may also be provided at the top, bridging, and secured at its inner and outer peripheries to, pilot neck 35 and head ring 26, respectively.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

I claim:

1. In a hydraulic weighing scale construction, a hollow cylinder including a plurality of internal cylindrical wall portions of different diameters and having a head closure member at one end provided with an axially positioned aperture defining a hardened internal surface, said diameters of said wall portions decreasing progressively from said end of the cylinder toward the other end, a piston fitted in said cylinder and having a skirt portion operatively interfitted with a wall portion of said cylinder of intermediate diameter, an annular bearing member fitted into said cylinder on the opposite side of said skirt portion from said closure member and held in a portion of said cylinder which is larger than the cylinder portion with which the skirt portion is interfitted and which is spaced from said piston in an axial direction, said annular bearing member having a hardened and apertured internal bearing portion defining an aperture extending therethrough coaxially with respect to the piston, a reduced bearing supporting portion concentrically fixed to the piston and extending upwardly from said skirt portion into interfitted relation with, but of substantially smaller diameter than, the first-mentioned aperture-defining surface, a hardened ring on said bearing-supporting portion, antifriction bearing means reacting against said ring and against said hardened surface of the head closure member, a second reduced bearing supporting portion concentrically fixed to said piston and projecting downwardly from said skirt portion into interfitted relation with, but being of substantially smaller diameter than said aperture in the annular bearing member, a hardened ring on said second bearing-supporting portion, and antifriction bearing means coacting with said last-mentioned ring and with the aperture in the annular bearing member.

2. Means as defined in claim 1 wherein said head closure member is of graduated external diameter and has its portion of larger diameter facing said skirt portion of the piston and is interfitted with a similarly graduated internal surface of the cylinder, being thereby locked against movement away from the skirt portion.

3. Means as defined in claim 1 wherein said head closure member is of graduated external diameter and has its portion of larger diameter facing said skirt portion of the piston and is interfitted with a similarly graduated internal surface of the cylinder, being thereby locked against movement away from the skirt portion, said skirt portion being spaced from said head closure member to define a pressure space, an O-ring-type seal carried by said first-mentioned reduced bearing-supporting portion and sealing the same with respect to said head closure member, and a second O-ring-type seal carried by said skirt portion and sealing the same with respect to the cylinder.

4. In a hydraulic scale or the like, a hollow metallic cylinder having a head at one end, a piston reciprocable in the cylinder, a pilot neck extending rigidly from and forming a fluid-tight extension of the piston on one side of the latter and extending slidably through an aperture in said head, bearing and sealing portions for guiding and sealing the pilot neck with respect to the head, tensioning means also connected to the piston for urging the piston toward said head to pressurize a liquid trapped between the piston and head, said tensioning means extending outwardly from the piston in the same direction as said neck and being accessible from outside said head, a transverse bearing support rigid with respect to said cylinder on the opposite side of said piston from said head, a pilot portion extending rigidly from the other side of said piston to travel therewith and slidable in an aperture in said bearing support, coacting bearing portions carried by said pilot portion and bearing support, said neck and pilot portion being of substantially smaller diameter than the piston, and said bearing portions holding the piston against axial misalignment with respect to the cylinder, said bearing portions including opposed hard metallic sections carried by said neck and head, and bearing balls interposed between and reacting against said opposed sections, opposed hard metallic sections carried by said pilot portion and support, bearing balls interposed between and reacting against said last-mentioned sections, and second tensioning means secured to said cylinder and extending in the opposite direction from said first-mentioned tensioning means.

References Cited in the file of this patent

UNITED STATES PATENTS

| | | |
|---|---|---|
| 1,798,076 | Frisch | Mar. 24, 1931 |
| 1,822,628 | Lincoln | Sept. 8, 1931 |
| 2,532,663 | Ellis | Dec. 5, 1950 |
| 2,643,873 | Wise | June 30, 1953 |